INVENTOR
Jing-Jue Young.
BY A. Samuel Oddi
ATTORNEY

United States Patent Office 3,467,882

Patented Sept. 16, 1969

3,467,882

SCANNING CIRCUITS OPERATIVE WITH LINE VOLTAGE TYPE OF POWER SUPPLY

Jing-Jue Young, Elizabeth, N.J., assignor to Westinghouse Electric Corporation, Pittsburgh, Pa., a corporation of Pennsylvania Filed Nov. 23, 1966, Ser. No. 596,501
Int. Cl. H01j 29/70
U.S. Cl. 315—27 22 Claims

ABSTRACT OF THE DISCLOSURE

A horizontal output scanning circuit is disclosed operative with a line voltage type of power supply and which utilizes a semiconductor switching device, such as a transistor or a gate controlled switch. A feeder device, such as a transistor, is used to supply energy to the scanning circuit only during the retrace portion of the scanning cycle.

The present invention relates to scanning circuits and more, particularly, to line voltage operated scanning circuits for use in television receivers.

It is highly desirable to utilize a line voltage type of power supply which employs only a diode and filter to supply the B+ operating potential for a television receiver. The line voltage-type power supply, or as it is sometimes called the transformerless type, provides cost, size and weight advantages over a power supply utilizing an input transformer which transforms the input line voltage to a suitable lower operating voltage level at its secondary. In television receivers utilizing vacuum-tube circuitry, the line voltage type of power supply is commonly and widely used. However, because of the limited voltage breakdown characteristics of transistors, the use of line voltage type of power supplies in transistorized television receivers has been prohibitive. It has thus been necessary to utilize a transformer type of power supply or to utilize a hybrid vacuum-tube-transistor arrangement.

The limitations of transistors are especially apparent in considering the horizontal output scanning circuitry of a television receiver. During the retrace portion of the horizontal scanning cycle, the retrace voltage that is impressed across the horizontal output transistor, which is turned off during the retrace portion of the cycle, may be in the order of ten times the operating potential applied to this circuit. Taking for example a horizontal output transistor which has a collector-emitter breakdown voltage of 300 volts, it would be necessary that a power supply voltage of approximately 30 volts be applied thereto to avoid breakdown of the transistor during the retrace portion of the scanning cycle. This necessitates the use of a transformer type of power supply to provide an operating potential at this low voltage level.

On the other hand, if a line voltage type of power supply, with a nominal output of, for example, 140 volts, were to be utilized, it would be necessary that a transistor having a collector-emitter breakdown voltage of approximately 1,400 volts be employed. Both solutions of utilizing a transformer power supply or a very high breakdown voltage transistor, even if available, are undesirable due to factors such as cost, size and weight.

It is therefore an object of the present invention to provide a new and improved scanning circuit employing semiconductor devices operative from a line voltage type of power supply.

It is a further object to provide a new and improved scanning circuit utilizing a transistor device and being operative with a line voltage type of power supply wherein the device is protected against damage.

It is a further object to provide a new and improved scanning circuit utilizing a transistor device having a relatively low breakdown voltage and being operative with a line voltage type of power supply.

Broadly the above cited objects are accomplished by providing a scanning circuit utilizing semiconductor devices wherein, power is fed into the scanning circuit only during the retrace portion of the scanning cycle through a feeder device. This permits the use of a line voltage type of power supply, the voltage across the switching element being limited to a relatively low and suitable value even with the operating voltage supplied by the line voltage type of power supply.

These and other objects and advantages of the present invention will become more apparent when considered in view of the following specification and drawings in which.

Figure 1:
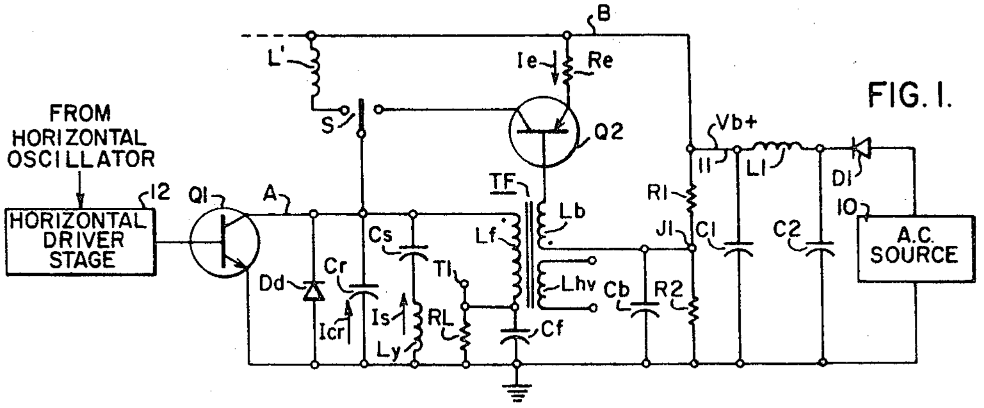
FIGURE 1 is a schematic diagram of one embodiment of the present invention.
Figure 2:
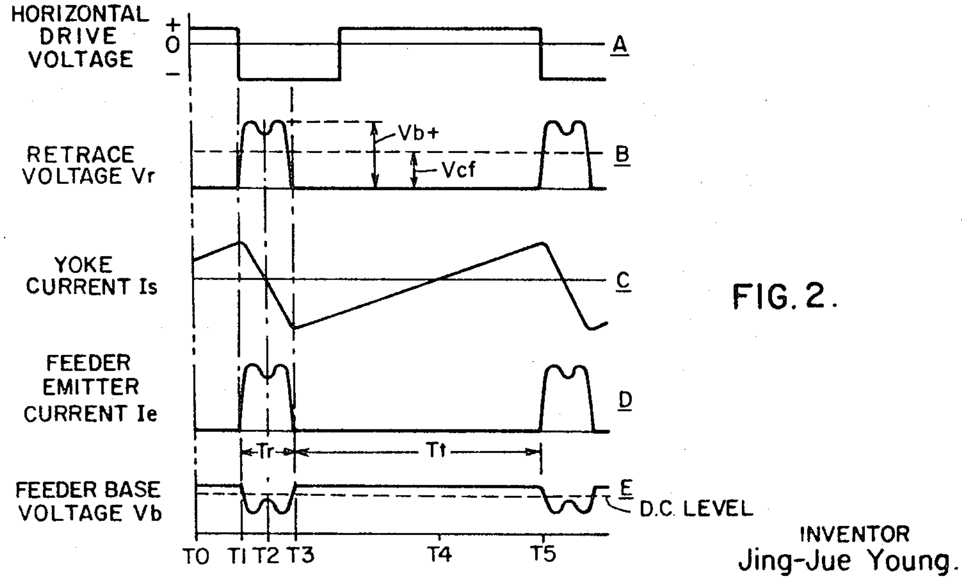
FIG. 2 is a waveform diagram comprising curves A through E which are used to explain the operation of the present invention.

Referring now to FIGS. 1 and 2, a horizontal output scanning circuit is shown in FIG. 1 suitable for use in a television receiver which embodies features of the present invention. The power supply used in FIG. 1 comprises a conventional line voltage type of power supply which is driven by an AC source shown schematically by a block 10. The source 10 may for example supply 120 volt, 60 cycle, line voltage. The line voltage power supply itself includes a diode D1, which has its anode connected to the AC source 10 and its cathode connected to a filter circuit which includes a filter inductor L1 and a pair of filter capacitors C1 and C2. The inductor L1 is connected in series with the diode D1 while the capacitors C1 and C2 are respectively connected from opposite ends of the inductor L1 to ground. At a point B, a voltage V*b*+ is developed which acts as the filtered operating voltage for the horizontal output circuit. This voltage nominally may be +140 volts DC as a typical example thereof.

The switching element of the horizontal output scanning circuit shown in FIG. 1 is shown as a transistor Q1 of the NPN conductivity type, but, of course, other equivalent semiconductor switching devices could be utilized, such as a PNP type transistor or a gate-controlled switch (GCS). The input to the horizontal output transistor Q1 is supplied from the horizontal driver stage 12 of a television receiver, which in turn is supplied from a horizontal oscillator, not shown. The input wavefrom supplied to the base of the transistor Q1 is shown in curve A of FIG. 2. The frequency of the waveform shown in curve A will be at the horizontal scanning frequency of 15,750 Hz.

The collector of the transistor Q1 defines a point A and the emitter thereof is grounded. A damper diode D*d* is connected between the collector and emitter electrodes of the transistor Q1, with the cathode of the damper diode D*d* connected to the collector electrode of the transistor Q1 and the anode electrode of the damper diode D*d* connected to the emitter electrode. The transistor Q1 and the diode D*d* are thus connected in opposite polarities with respect to one another as to current conduction. A capacitor C*r* is connected between the collector and emitter electrodes of transistor Q1, and acts as the resonating capacitor for the output scanning circuit as shown. A deflection yoke L*y* is connected in series with a capacitor C*s* with the series combination being connected between the collector and emitter electrodes of the transistor Q1. The scanning current I*s* flows through the deflection yoke L*y* as shown in FIG. 1 and in curve C of FIG. 2. The capacitor C*s* operates as an "S" correction capacitor to provide flat-face correction for the cathode ray tube associated with the television receiver.

In the circuit of FIG. 1, a horizontal output transformer TF (sometimes termed the high voltage or fly back transformer) is provided. The transformer TF includes a primary winding L*f* that is connected in series with a capacitor C*f* with the series combination being connected between the collector and emitter electrodes of the transistor Q1. The transformer TF also includes a high voltage winding L*hv*, and a secondary winding L*b* whose function will be explained below.

Assume for the moment that a switch S is in the open position, and also assume that all circuit components are lossless and that capacitors C*f* and C*s* are charged to the proper operating potentials. The transistor Q1 is conductive at the time T*o* because of the positive polarity pulse applied to the base thereof by the horizontal driver stage 12, see curve *a*, FIG. 2. At a time T1 the horizontal drive voltage goes negative thus making the base electrode of the NPN type transistor Q1 negative with respect to the grounded emitter electrode thereof. Thus the transistor Q1 will be rendered non-conductive at time T1. The current path being opened through the transistor Q1, the deflection current I*s* through the deflection yoke L*y* will begin to decrease toward zero current reaching this value as shown in curve C of FIG. 2 at a time T2. With the current I*s* decreasing toward zero, the capacitor C*r* is being charged. At the time T2 the capacitor C*r* has reached its maximum charge level at zero current. The current I*s* then reverses itself through the deflection yoke L*y* and reaches its maximum negative excursion at the time T3. The resonating capacitor C*r* is substantially discharged at the time T3. As the resonance between the capacitor C*r* and the inductance of the circuit tries to continue the capacitor C*r* will charge to a voltage sufficient to forward bias the damper diode D*d*. The voltage on the capacitor C*r* will thus be clamped to this value with the negative yoke current I*s* beginning a substantially linear decay through the damper diode D*d* until reaching a zero current at a time T4.

The time period between times T1 and T3 defines the retrace period of the scanning cycle this time being indicated by the period T*r* as shown in FIG. 2. The retrace period T*r* is determined by the values selected for the resonating capacitor C*r* and the other components of the circuitry. At a time somewhat prior to the time T4 the horizontal drive voltage (see curve A, FIG. 2) goes positive to bias the transistor Q1 to its conductive state. Thus, at the time T4, the transistor Q1 is conductive to permit the scanning current I*s* to increase in the positive direction as shown in curve C of FIG. 2 reaching a maximum positive excursion at a time T5. The horizontal drive voltage is made to go positive prior to the time T4 in order to insure that the transistor Q1 will be conductive at the time T4. At the time T5 the horizontal drive voltage again goes negative to turn off the transistor Q1 and begin the retrace portion of the scanning cycle as previously described. The trace portion of the scanning cycle is defined between the times T3 and T5 as shown in FIG. 2 as the time period T*t*.

The discussion of the circuitry of FIG. 1 has been made so far under the assumption that it is a lossless circuit and that a suitable operating potential has previously been introduced and maintained therein. In an actual horizontal output circuit, of course, losses will occur, and it will be necessary to provide a source of operating potential therefor to replenish these energy losses. In the state of the art, this is usually accomplished by connecting an inductive reactance between the source of operating potential and the horizontal output transistor, or a DC power source across C*f*. In the embodiment given in FIG. 1, this would entail connecting, for example, a choke L′ between the points A and B through a switch S by placing the switch in one of the switch positions, and with transistor Q2 disconnected from the circuit. If such a choke L′ is connected between the points A and B, power is supplied to the horizontal output circuit to sustain its operation with power being transferred into the circuit during the whole scanning cycle. The switch S and the choke L′ do not comprise part of the present invention and are shown only to aid in the explanation.

In this case, during the trace portion of the scanning cycle, the transistor Q1 has a very low voltage appearing between its collector and emitter electrodes. However, during the retrace portion of the cycle with the transistor being turned off, a high voltage, which may be of the order of ten times the value of the power supply operating voltage V*b*+, appears across the collector and emitter electrodes. Thus, under the assumption that the choke L′ is connected between the points A and B, when the transistor Q1 is rendered nonconductive, the interruption of current flow therethrough will induce a voltage the magnitude of which will be approximately ten times the magnitude of the power supply voltage V*b*+. It will therefore be necessary to utilize a V*b*+ voltage which is relatively low so as to match the breakdown voltage characteristics of the transistor used. (V*b*+ to be less than one-tenth of the transistor breakdown voltage.)

In another consideration, with the circuit configuration of FIG. 1, if a line voltage type of power supply is to be utilized, it is necessary that the transistor Q1, assuming the choke L′ is connected between the points A and B, be selected to have a breakdown value of approximately ten times the nominal value of the voltage V*b*+, on the lead 11 thereof. However, through the use of the transistor Q2 and the additional circuitry to be discussed in FIG. 1 this requirement is overcome.

As previously mentioned in the state of the art type of transistor horizontal output circuit, energy is fed into the system to compensate for losses during the whole scanning cycle. If, however, energy is fed into the circuit during only the retrace portion of the scanning cycle, only to the extent necessary to compensate for losses therein, it becomes possible to reduce the magnitude of the retrace voltage appearing across the collector-emitter electrodes of a horizontal output transistor such that a line voltage type of power supply can be used with the horizontal output transistor having a collector-emitter breakdown voltage slightly higher than the power supply voltage. On this basis consider again the circuit shown in FIG. 1, with the switch S being connected to the collector of transistor Q2 and the choke L′ out of the circuit.

The second transistor Q2, termed herein as the feeder transistor, has its collector electrode connected to the point A at the collector of the transistor Q1. The transistor Q2 is shown as a PNP conductivity type, however, other types of equivalent semiconductor devices could be used. The emitter electrode of the transistor Q2 is connected through an emitter degenerative resistor R*e* to the point B at the V*b*+ voltage. The base of the feeder transistor Q2 is connected to one end of the secondary winding L*b*. The other end of the winding L*b* is connected to a junction point J1 between a pair of resistors R1 and R2 which form a voltage divider and are connected between the point B and ground. Between the junction point J1 and ground is connected a capacitor C*b*. The windings L*f* and L*b* of the transformer TF are wound with respect to each other according to the dot convention as shown, with the dot on the winding L*f* being adjacent the collector of the transistor Q2 and the dot on the winding L*b* being adjacent the junction point J1, so as to provide a phase inversion of the voltage at the transistor Q2 with respect to the voltage at the primary of transformer TF. This polarity reversal is required to insure that the PNP transistor Q2 is to be turned on during retrace and off during trace.

Considering the function of the feeder transistor Q2, in FIG. 1, the bias arrangement, which includes resistors R1, R2 and R*e*, and capacitor C*b*, is exactly the same as a conventional class "B" amplifier. However, the bias arrangement performs an important function which is quite different from a conventional class "B" amplifier. It provides a starting current for the circuit to build-up to its normal operational mode. This starting current, due to the bias network, is usually provided so that it is small compared to the normal DC current flowing into point B from the power supply under normal circuit operating conditions, and so that the collector dissipation of the feeder transistor Q2 is within its rating when its collector is grounded. At the beginning of the operation, the starting current begins to charge the capacitors C*f* and C*s*. The direct voltage across the capacitors starts to build up. Then, due to the switching action of the horizontal output transistor Q1, driven by the horizontal driver stage 12, the retrace pulse voltage at point A starts to increase. This pulse voltage is coupled through transformer TF with such a polarity to drive the feeder transistor Q2 harder during retrace. This action, in turn, increases the current feeding into the circuit through point A, and also charges these capacitors C*f* and C*s* to an even higher voltage. Then the retrace voltage at point A increases even further. This type of chain action causes the circuit to build up into a normal operational mode. The build-up, however, is limited to a value slightly less than the power supply voltage when the feeder transistor Q2 goes into saturation. This saturation action defines the equilibrium state of the normal mode of operation.

The voltage waveform across the secondary winding L*b* on transformer TF is of the same shape as that shown in FIG. 2, curve B, except that it has a negative polarity. This type of waveshape has a zero DC level due to the transformer coupling action. Hence, assuming a reversed polarity waveform of FIG. 2, curve B, the voltage during retrace, is below the DC level, and the voltage during trace is above the DC level. This is shown in FIG. 2, curve, E, with the DC level above ground potential due to the bias resistors R1 and R2. Because of this waveshape, the feeder transistor Q2 is turned off during trace, and driven into conducting only during retrace. In view of the operational action of the feeder transistor Q2, it performs the function of a class "B" amplifier during retrace.

After the steady-state normal operational mode has been reached, the voltage on the collector of the horizontal output transistor Q1 during retrace is clamped slightly below V*b*+ voltage due to the voltage drop across the resistor R*e* and the collector-emitter junction of feeder transistor Q2.

The dotted line in curve B of FIG. 2 shows the voltage V*cf* appearing across the capacitor C*f* in series with the primary winding L*f*. This is a DC voltage of approximately one-sixth of the V*b*+ voltage. Normally a load can be connected between this DC voltage and ground, and thus provides a low DC voltage source for other circuits of a television receiver. As shown in FIG. 1 a load resistor R2 is connected across the capacitor C*f* from a terminal T1 to ground. The DC voltage developed at T1 may then be used to supply other portions of the television receiver.

Thus, if the magnitude of the voltage V*b*+ is normally 140 volts, a horizontal output transistor such as the transistor Q1 may be utilized which has a breakdown voltage only slightly greater than this value without fear of damage to the transistor Q1. Moreover, if desired, a voltage doubler type of power supply, which is well known in the art and normally provides a 270 volt output, can be utilized if a transistor having a breakdown voltage slightly in excess of this value is employed. In the circuit of FIG. 1, the collector-emitter voltage breakdown requirement under pulse conditions of feeder transistor Q2 need only be slightly higher than whatever V*b*+ voltage is used.

The emitter current I*e* that is translated through the feeder transistor Q2 is shown in curve D of FIG. 2 and shows that the transistor Q2 is operated as a class "B" amplifier. Use of the class "B" amplifier mode is an inherently efficient manner of operation and, therefore, relatively high efficiency of operation is achieved in the circuit as shown in FIG. 1.

The ripple appearing on top of the retrace voltage pulses and the emitter current pulses is due to the third harmonic tuning of the transformer TF whose inductance and leakage capacitance is so designed to be resonant at third harmonic of the retrace frequency, which is standard practice within the television receiver art.

The horizontal output scanning circuits as disclosed herein have the further advantage of providing inherent protection for the horizontal output transistor Q1 against high voltage arcing which commonly occurs in the picture tube of television receivers, and, moreover, the feeder transistor Q2 is protected against damage due to failures of either the horizontal output transistor Q1 or the damper diode D*d*. When high voltage arcing occurs in the picture tube, this is equivalent to short circuiting of the loosely coupled high voltage winding L*hv*, through the high voltage rectifier to ground. Such high voltage arcing causes a reduction in the driving voltage available for the feeder transistor Q2 due to the effective short across the high voltage winding L*hv* and results in less power being supplied to the horizontal output circuit. Thus, the retrace voltage appearing from the point A to ground will be reduced as will be the yoke current I*s*. This results in a decreased current through the horizontal output transistor Q, as well as a decrease in retrace voltage thereacross. With these quantities being reduced, the horizontal output transistor Q1 is thus effectively protected against failure when high voltage arcing occurs.

Protection of the feeder transistor Q2 is also afforded if either the horizontal output transistor Q1 or the damper diode D*d* fails since this results in the shorting of the point A in FIG. 1 to ground. Thus, there is a short circuiting of the primary winding L*f* of the flyback transformer TF causing the driving power for the feeder transistor Q2 to be removed resulting in less input power being provided by the power supply.

The feeder transistor Q2 is protected from excessive collector power dissipation by the biasing arrangement including the resistors R1, R2 and the emitter degenerative resistor R*e* as mentioned before.

Another important advantage of this circuit is that the horizontal output transistor Q1 in FIG. 1 can be replaced by another type of semiconductor device, such as a gate-controlled switch (GCS). Two important problems must be discussed in association with this advantage.

First, the problem associated with gate-controlled switch as a horizontal output device is due to high voltage arcing between the picture tube anode and ground. In a conventional scan circuit, this type of arcing will cause a large increase in anode current of the GCS, typically about three times its normal current. Due to the limited turn-off capability of the GCS, it will stay in the "on"

state, and draw a large DC current from the power supply after the arcing is over. Because this DC current is large enough to prevent the GCS from being turned off, the scan system collapses and can not recover. However, with transistor feeder Q2 in FIG. 1, as explained before, during this type of arcing, because it causes the removal of driving power from the feeder transistor Q2 and the decrease of DC current from the power supply, the circuit will reestablish to normal operation after the arc is cleared. This self-healing action enables the use of a GCS as a horizontal outputd evice which has definite advantages over available transistors.

The second problem is associated with the arcing between high voltage rectifier anode and cathode. This presents even more severe requirements on the horizontal output transistor, and requires expensive protective circuitry for a conventional circuit, as well as the circuit shown in FIG. 1. The complete mechanism of this type of operation is discussed in "Destructive Circuit Malfunctions and Corrective Techniques in Horizontal Deflection" by C. F. Wheatley, I.E.E.E. Transactions on Broadcast and TV Receivers, July 1965. In a GCS, the turn-off capability is quite limited. When its anode current exceeds a certain value, the device can no longer be turned off by its gate drive. Also, a GCS normally can take a much more temporary overload in anode current than a transistor in collector current overload. However, due to these particular characteristics, with a GCS as the horizontal output device, in the circuit of FIG. 1, the circuit is protected against this type of arcing without any additional protective circuitry. This is because the GCS will conduct the extremely high pulse current present during rectifier arcing (perhaps ten to twenty times normal peak scan current) with only a small increase in its forward voltage drop without causing GCS failure. While with a transistor, there is inadequate base drive and current gain to hold the transistor in saturation during these large current pulses, and the transistor being out of saturation must dissipate very large power peaks that are usually large enough to cause transistor failure. Another advantage with a GCS is the economy in horizontal driver circuit, since the GCS gate drive power required is considerably less than required by a transistor as Q1.

FIGURES 1A, 3, 5, 7, 8, 9 and 10 show other embodiments of the present invention. In these figures the same reference characters will be utilized to show the similar components to those appearing in FIG. 1. These circuits operate similarly to that of FIG. 1, but include somewhat different operating and circuit arrangements for the feeder transistor Q2. It should be noted that for transistors Q1 and Q2 in the circuits of FIGS. 1, 3, 5, 7, 8, 9 and 10 that a PNP type of transistor could be utilized to replace an NPN transistor and likewise an NPN type could be utilized to replace a PNP type with, of course, the necessary change in polarity of the operating voltage power supply or the connection of the transistors. It also sohuld be noted that transistor Q1 can be replaced with a GCS in these circuit arrangements.

Figure 1A:
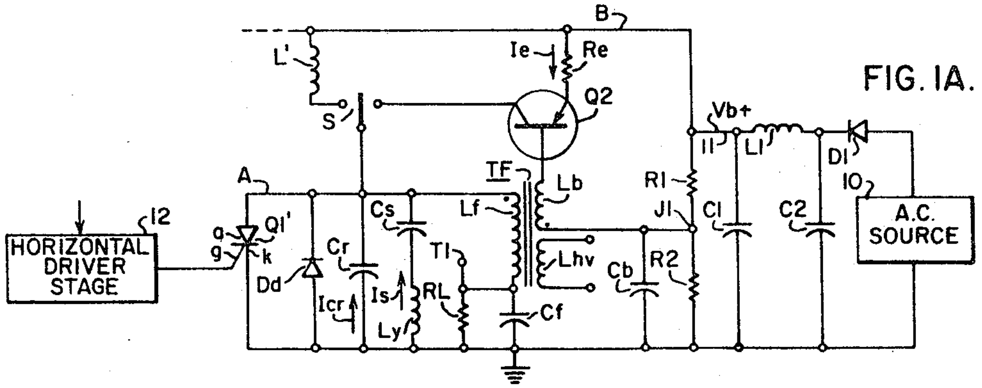
FIG. 1A is a schematic diagram of another embodiment of the present invention.

FIG. 1A shows an identical circuit to FIG. 1 except that the transistor Q1 has been replaced with a gate controlled switch Q1'. The anode electrode *a* of the gate controlled switch Q1' is connected to the point A, while its cathode electrode K is grounded. The gate electrode thereof is connected to the output of the horizontal driver stage 12. The operation of the GCS Q1' is identical to that of the transistor Q1 with the application of a positive polarity voltage to the gate electrode *g* rendering it conductive and the application of a negative voltage rendering it non-conductive. The structure and operation of the remaining circuitry of FIG. 1A is identical to that of FIG. 1, with the advantages being gained through the use of the GCS Q1' as previously discussed.

Figure 3:
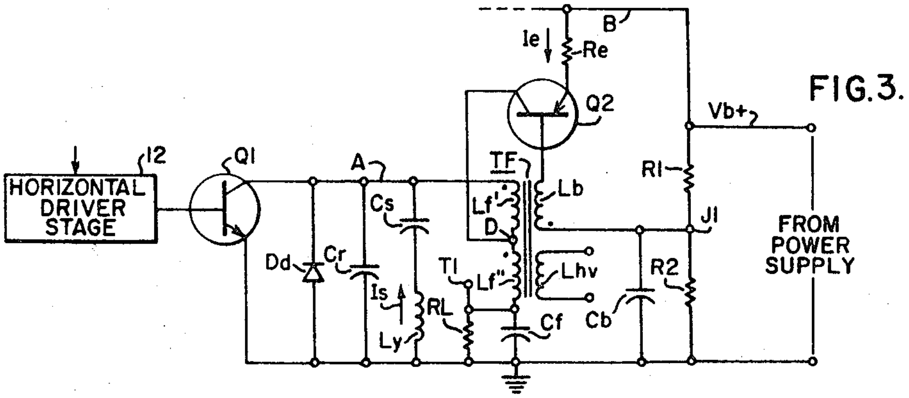
FIG. 3 is a schematic diagram of another embodiment of the present invention.

FIG. 3 shows a horizontal output scanning circuit in which a horizontal output transistor Q1 having a collector-emitter breakdown voltage higher than that of the power supply voltage is utilized. In the circuit shown in FIG. 3, the primary winding of the flyback transformer TF has a tap D thereon dividing the transformer winding into a top winding $Lf'$ and a bottom winding $Lf''$. The collector of the feeder transistor Q2 is connected to the point D. The dotted end of the winding $Lf'$ is connected to the point A, while the dotted end of the winding $Lf''$ is connected to the point D. The remaining components in the circuit of FIG. 3 are similar to those shown in FIG. 1.

Figure 4:
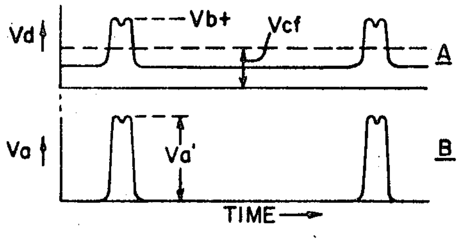
FIG. 4 is a waveform diagram comprising curves A and B used in explaining the operation of the present invention.

Reference is also made to the wave form diagram of FIG. 4. By connecting the collector of the feeder transistor Q2 to the point D between the windings $Lf'$ and $Lf''$, the point D is essentially clamped to the $Vb+$ voltage at the point B during the retrace portion of the scanning cycle. This is shown in curve A of FIG. 4 where the voltage appearing at the point D, designated $Vd$, is plotted as a function of time. It can be seen that during the retrace portion of the scanning cycle the voltage at the point D reaches a maximum value of approximately $Vb+$. The dotted level indicates the voltage $Vcf$ across the capacitor $Cf$.

The winding $Lf'$ is connected between the point D and the point A, the magnitude of voltage appearing at point A with respect to ground during the retrace portion reaches a maximum value $Va'$ as shown in curve B of FIG. 4. This voltage may be several times higher than the $Vb+$ voltage from the power supply depending upon the turns ratio of the winding $Lf'$ to the winding $Lf''$. The circuit will operate satisfactorily as long as the collector-emitter breakdown voltage of the horizontal output transistor Q1 is selected to have a value greater than the value $Va'$. If the $Vb+$ voltage is 140 volts, a typical example of the voltage at the point $Va'$ during retrace portion of scanning cycle may be in the order of 550 volts. An example of circuit values which could be utilized in the circuits shown in FIG. 3 is as follows:

Transistor Q1—DELCO DTS 423, 700-volt collector-emitter breakdown voltage.
Transistor Q2—RCA 2N3731, 200-volt collector-emitter breakdown voltage under pulsed conditions.
Capacitor $Cr$—7,500 pf.
Capacitor $Cs$—0.75 $\mu$f.
Capacitor $Ff$—5 $\mu$f., 200 volts.
Capacitor $Cb$—10 $\mu$f., 200 volts
Resistor $Re$—10Ω.
Resistor R1—1KΩ.
Resistor R2—100KΩ.
Deflection yoke—$Ly$ 640 $\mu$h.
$Vb+$—+140 volts.

Figure 5:
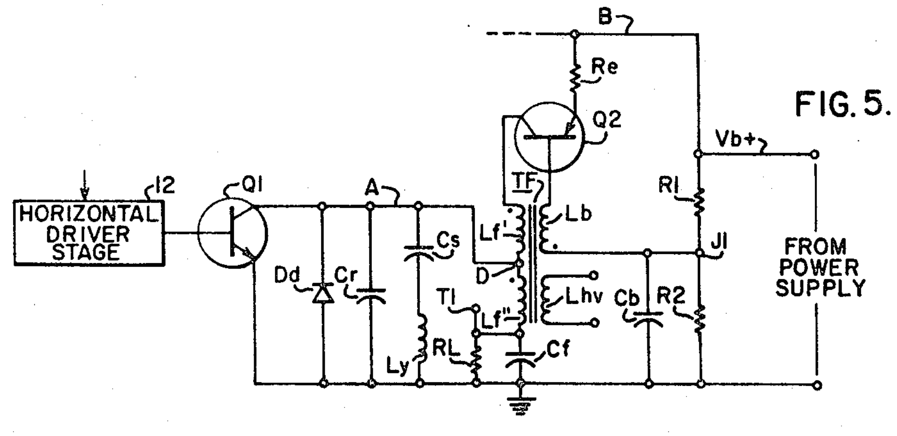
FIG. 5 is a schematic diagram of another embodiment of the present invention.

FIGURE 5 shows an embodiment in which the horizontal output transistor Q1 may have breakdown voltage of less than the $Vb+$ voltage. In FIGURE 5, the primary winding of the flyback transformer TF is split similarly as shown in FIGURE 3 into windings $Ly'$ and $Ly''$ with a point D therebetween. However, in FIGURE 5 the point D is commonly connected to the point A, while the dotted end of the winding $Lf'$ is connected to the collector electrode of the transistor Q2. The point D is therefore held at a voltage somewhat less than the $Vb+$ voltage during the retrace portion of the scanning cycle when the transistor Q2 provides an output at the collector thereof. By selecting the point at which the windings $Ly'$ and $Ly''$ are separated the magnitude of the voltage developed at the point A with respect to ground may be selected. This voltage will be less than the $Vb+$ voltage since the collector at the top end of the winding $Ly'$ approaches only the $Vb+$ voltage during the retrace portion of the scanning cycle and the point D is at a lower voltage point between the windings $Ly'$ and $Ly''$. The components and operation of FIGURE 5 are otherwise substantially the same as shown in the embodiments of FIGURE 1 and FIGURE 3.

Figure 6:
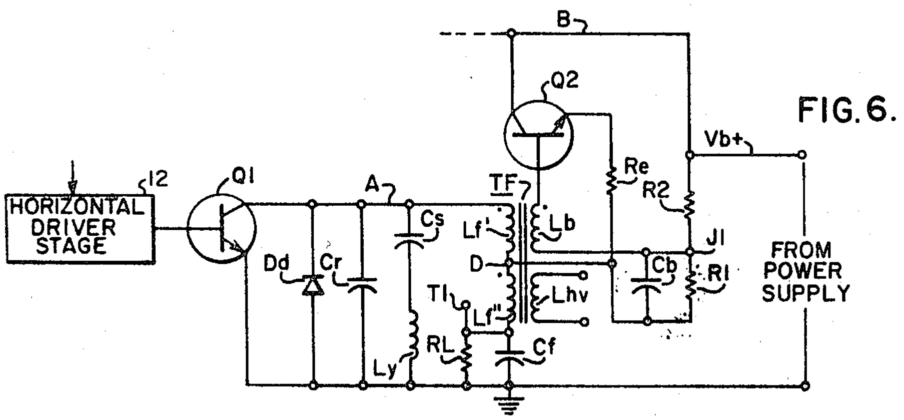
FIG. 6 is a schematic diagram of another embodiment of the present invention.

FIGURE 6 shows another embodiment in which both the horizontal output transistor Q1 and the feeder transistor Q2 are of the NPN conductivity type. The circuit of FIGURE 6 is substantially the same as that of FIGURE 3 except for the use of the NPN type of transistors and the coupling of the base of the feeder transistor Q2 to the dotted end of the winding L*b* of the flyback transformer TF. The collector electrode of the transistor Q2 is connected to the point B at the V*b*+ power supply potential, while the emitter of the transistor Q2 is coupled through the emitter degenerative resistor R*e* to the point D between the windings L*f*′ and L*f*″ of the transformer TF. The voltage divider resistors R1 and R2 are respectively connected between the points D and B with the junction point J1 therebetween being connected to the undotted end of the winding L*b*. The dot convention as shown in FIGURE 6 is such that the polarity of pulse developed at the winding L*b* during the retrace portion of the scanning cycle will be positive with respect to ground which will permit the feeder transistor Q2 to supply current therethrough during this portion of the scanning cycle. Components and operation of the circuit of FIGURE 6 are otherwise the same as those described with respect to FIGURE 3. The transistor Q1 utilized in the circuit of FIGURE 6 would require a higher breakdown voltage than the V*b*+ voltage. However, an arrangement such as shown in FIGURE 5 could be utilized if desired with the transistor Q1 having a lower breakdown voltage.

Figure 7:
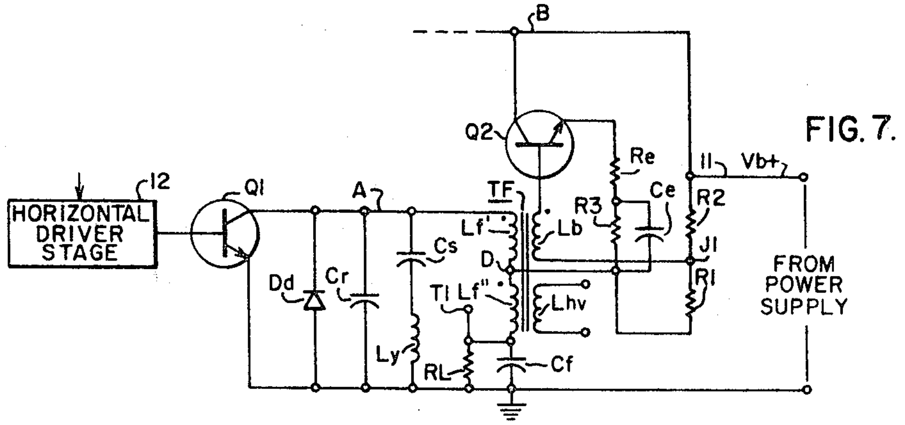
FIG. 7 is a schematic diagram of another embodiment of the present invention.

In FIGURE 7, a horizontal output circuit is shown having a somewhat different biasing arrangement for the feeder transistor Q2. The circuit of FIGURE 7 is similar to that of FIGURE 6 in utilizing NPN type transistors for the transistors Q1 and Q2. However, rather than shunting the resistor R1 with a capacitor C*b*, a capacitor C*e* is connected across a resistor R3 with the parallel combination of C*e* and R3 being connected in series between the bottom end of the resistor R*e* and the point D. The capacitor C*e* is thus charged to the polarity as shown during the retrace portion of the scanning cycle to such a voltage level to bias the emitter electrode of the feeder transistor Q2 sufficiently positive with respect to the base electrode thereof to help to render the feeder transistor Q2 nonconductive during the trace portion of the scanning cycle. The components and operation of the circuit of FIGURE 7 are otherwise similar to the embodiment shown in FIGURE 6.

Figure 8:
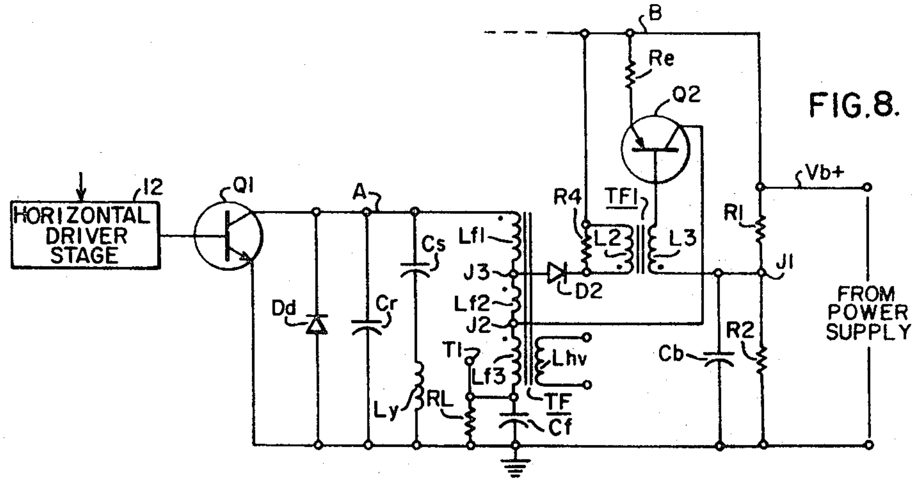
FIG. 8 is a schematic diagram of another embodiment of the present invention.

FIGURE 8 shows another embodiment of the horizontal output circuit of the present invention wherein a separate driver transformer TF1 is utilized to supply the necessary input to the base of the feeder transistor Q2. The feeder transistor Q2 in FIGURE 8 is shown as a PNP type with the horizontal output transformer Q1 being shown as an NPN type. Also in FIGURE 8 the primary winding of the output transformer TF includes three separate winding sections L*f*1, L*f*2 and L*f*3. The capacitor C*f* is connected between the bottom end of the winding L*f*1 and ground. A junction point J2 between the windings L*f*2 and L*f*3 is connected to the collector electrode of the feeder transistor Q2. To a junction point J3 between the windings L*f*1 and L*f*2 is connected the anode electrode of a diode D2 which has its anode connected to a primary winding L2 of the driver transformer TF1 at the dotted end thereof. The undotted end of the winding L2 is connected to the point B. A resistor R4 is connected across the primary winding L2. The secondary winding L3 of the transformer TF1 has its undotted end connected to the base of the feeder transistor F2 and its dotted end connected to the junction point J1 between point B and ground.

The operation of FIGURE 8 is similar to that as described with the other embodiments except that the input to the feeder transistor Q2 is supplied by the separate driver transformer TF1 rather than being developed in the output transformer TF. The diode D2 is so poled to prohibit current to flow from the V*b*+ line to the point J3 on the output transformer TF. However, during the retrace portion of the scanning cycle a voltage at the point J3 at the anode of the diode D2 will be developed which is sufficiently higher than the V*b*+ voltage to permit the diode D2 to conduct in the forward direction and thereby energize the primary winding L2 of the driver transformer TF1. A negative polarity voltage will thus be developed at the undotted end of the secondary winding L3 which will supply an input to the feeder transistor Q2 of the proper polarity so as to permit energy to flow from the V*b*+ source through the emitter-collector circuit of transistor Q2 into the junction point J2 on the primary winding of the high voltage transformer TF to supply the horizontal output scanning circuit.

Figure 9:
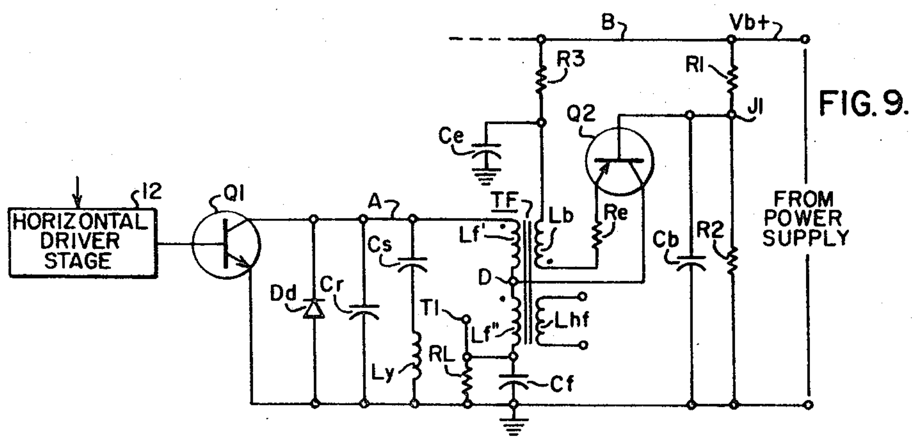
FIG. 9 is a schematic diagram of another embodiment of the present invention.

FIGURE 9 shows another embodiment of a horizontal output scanning circuit in which the feeder transistor Q1 is operated as a common-base amplifier. In FIG. 9 the collector electrode of the transistor Q2 is connected to the point D between the primary windings L*f*′ and L*f*″ of the high voltage transformer TF. The emitter electrode of the transistor Q1 is connected through the resistor R*e* to the dotted end of the secondary winding L*b* of the transformer TF. The base electrode is connected to the junction point J1 between the voltage divider resistors R1 and R2. The operation of the circuit on FIG. 9 is such that during the retrace portion of the scanning cycle a voltage will be applied to the emitter electrode of the PNP feeder transistor Q2 which will permit the passage of current from the V*b*+ source through the emitter-collector circuit of the feeder transistor Q2 to the point D in the primary winding of the high voltage transformer TF. The operation in this respect was similar to the other embodiments shown herein. The capacitor C*e* and resistor R3 provides not only necessary bias voltage, but also acts as a decoupling filter for the power supply. In a practical circuit, the capacitor C*b* is chosen to provide speed-up action in turning "off" and "on" the feeder transistor Q2. The equivalent loading resistor R2 is placed there as a dummy load to show that the circuit is capable to supply low voltage DC power to other portions of a television receiver.

The voltage waveforms are the same as those shown in FIG. 4. An example of circuit values which could be utilized in the circuit shown in FIG. 9 is as follows:

Transistor Q1—Fairchild FT304, 400-volt collector emitter breakdown voltage with base reverse biased, and 7-amp collector-current capability.
Transistor Q2—RCA 2N3731, 320-volt collector-emitter breakdown voltage.
(However, the requirement is 200-volt of collector-emitter breakdown voltage under pulsed conditions.)
Capacitor C*r*—0.033 $\mu$f., 400-volt.
Capacitor C*s*—2.5 $\mu$f., 200-volt.
Capacitor C*f*—5 $\mu$f., 200-volt.
Capacitor C*e*—10 $\mu$f., 200-volt.
Capacitor C*b*—0.22 $\mu$f., 200-volt.
Resistor R*e*—5.6Ω, 10-watt.
Resistor R1—1 KΩ.
Resistor R2—100 KΩ.
Resistor R3—27Ω, 3-watt.
Resistor RL—150Ω, 10-watt.
Deflection Yoke L*y*—220 $\mu$h.
V*b*+—+145 volt.

The number of turns of flyback transformer windings L*f*′, L*f*″, L*b* and L*hv* are 30, 30, 5, and 2750 turns, respectively.

Although the present invention has been described with a certain degree of particularity, it should be understood that the present disclosure has been made only by way of example and that numerous changes in the details of circuitry and the combination and arrangement of elements and components may be resorted to without departing from the scope and spirit of the present invention.

I claim as my invention:

1. In an output scanning circuit operative with a power supply, the combination of:

feeder means including a first semiconductor device;

a second semiconductor device operative in a switching mode;

means for controlling the switched state of said second device to define the trace and retrace portions of the scanning cycle of said scanning circuit;

a deflection coil operatively connected to said second device for developing the scanning current for said scanning circuit;

transformer means operatively connected to said second device for providing an output in response to the switched state of said first device; and said feeder means including said first semiconductor device operatively connected between said power supply and said second device for supplying power to said scanning circuit only during the retrace portion of the scanning cycle.

2. The combination of claim 1 wherein:

said transformer means comprises an output transformer including a primary winding operatively connected to said second device and a secondary winding operatively connected to said first device for causing said first device to translate power to said scanning circuit only during the retrace portion of the scanning cycle.

3. The combination of claim 2 wherein:

said first semiconductor device comprises a first transistor device, having a plurality of input and output electrodes.

4. The combination of claim 3 wherein:

said first transistor device is operative in an amplifying mode, the output electrodes thereof being operatively connected between said power supply and said second semiconductor device and an input electrode being operatively connected to said secondary winding so that said first transistor device is provided with an input during the retrace portion of the scanning cycle from said secondary winding to permit said first transistor device to supply power to said scanning circuit during only the retrace portion.

5. The combination of claim 4 wherein:

a first capacitor being operatively connected to said primary winding of said output transformer and being operative to supply operating potential to said scanning circuit during the trace portion of the scanning cycle.

6. The combination of claim 5 wherein:

a second capacitor being operatively connected to said secondary winding and an input electrode of said first transistor device so that said second capacitor charges to a sufficient potential during the retrace portion of the scanning cycle to bias said first transistor device to a no output state during the trace portion of the scanning cycle.

7. The combination of claim 6 wherein:

said second semiconductor device having a breakdown voltage higher than the output of said power supply, said primary winding of said output transformer having a tap thereon, and the portion of said winding between said tap and one end thereof being connected, respectively, between output electrodes of said first and second devices.

8. The combination of claim 6 wherein:

said second device having a breakdown voltage lower than the output of said power supply, said primary winding of said output transformer having a tap thereon, and the portion of said primary winding between said tap and one end thereof connected, respectively, between output electrodes of said second and first devices.

9. The combination of claim 6 wherein:

said second semiconductor device comprises a second transistor device, and said first and second transistor devices are of the same conductivity type, and said secondary winding being so poled with respect to said primary winding to provide the proper polarity voltage to an input electrode of said first transistor device to cause said first transistor to translate power to said scanning circuit only during the retrace portion of the scanning cycle.

10. The combination of claim 5 wherein:

a second capacitor being operatively connected in the output circuit of said first transistor device and to said secondary winding of said output transformer so that said second capacitor charges to a sufficient potential during the retrace portion of the scanning cycle to bias said first transistor device to a no output state during the trace portion of the scanning cycle.

11. The combination of claim 5 further including:

a driver transformer including a primary winding operatively connected between said power supply and said primary winding of said output transformer and a secondary winding operatively connected to an input electrode of said first transistor device to cause said first transistor device to translate power therethrough to said scanning circuit only during the retrace portion of the scanning cycle.

12. The combination of claim 3 wherein:

said first transistor device being connected in an amplifying mode with a first output electrode operatively connected to said primary winding, said secondary winding being operatively connected between a second output electrode of said first transistor device and said power supply, a voltage divider network connected to said power supply, an input electrode of said first transistor device operatively connected to said voltage divider network, so that said first transistor device translates power therethrough to said scanning circuit only during the retrace portion of the scanning cycle.

13. The combination of claim 12 wherein:

said first transistor device includes base, collector and emitter electrodes and is operative as a common base amplifier, said first output, second output and input electrodes being said collector, emitter and base electrodes, respectively.

14. The combination of claim 13 wherein:

a first capacitor being operatively connected to said primary winding of said output transformer and being operative to supply operating potential to said scanning circuit during the retrace portion of the scanning cycle, and a second capacitor operatively connected to said base electrode of said first transistor device, with said second capacitor charging to a sufficient voltage during the retrace portion of the scanning cycle to bias said first transistor device to a no output state during the trace portion of the scanning cycle.

15. The combination of claim 1 wherein:

said second semiconductor device comprises a second transistor device.

16. The combination of claim 15 wherein:

said first and second semiconductor devices comprise, respectively, first and second transistor devices.

17. The combination of claim 1 wherein:

said second semiconductor device comprises a gate controlled switch.

18. The combination of claim 17 wherein:

said first semiconductor device comprises a first transistor device.

19. The combination of claim 1 wherein:
said power supply comprises a line voltage type of power supply.

20. The combination of claim 5 including:
means connected to said first capacitor for supplying a direct potential output therefrom.

21. The combination of claim 1 including:
sensing means responsive to the retrace portion of the scanning cycle for activating said first device to translate power to said scanning circuit during said retrace portion.

22. The combination of claim 21 wherein:
said first semiconductor device comprises a first transistor device including input and output electrodes,
said sensing means operatively connected to said input electrode, said output electrodes operatively connected between said power supply and said second semiconductor device,
said first transistor device being operative to translate power through said output electrodes to said scanning circuit in response to said input electrode being supplied by said sensing means during the retrace portion of the scanning cycle.

References Cited

UNITED STATES PATENTS 3,287,594 11/1966 Wada ---------------- 315—27

RODNEY D. BENNETT, Jr., Primary Examiner

J. G. BAXTER, Assistant Examiner